United States Patent
Liu et al.

(10) Patent No.: US 12,546,985 B2
(45) Date of Patent: Feb. 10, 2026

(54) DARK-FIELD CONFOCAL MICROSCOPY MEASUREMENT APPARATUS AND METHOD BASED ON APERTURE SCANNING OF VORTEX ILLUMINATION

(71) Applicant: Harbin Institute of Technology, Harbin (CN)

(72) Inventors: Jian Liu, Harbin (CN); Chenguang Liu, Harbin (CN); Zijie Hua, Harbin (CN); Kang Gu, Harbin (CN)

(73) Assignee: Harbin Institute of Technology, Harbin (CN)

( * ) Notice: Subject to any disclaimer, the term of this patent is extended or adjusted under 35 U.S.C. 154(b) by 0 days.

(21) Appl. No.: 18/812,674

(22) Filed: Aug. 22, 2024

(65) Prior Publication Data

US 2026/0029634 A1   Jan. 29, 2026

(30) Foreign Application Priority Data

Jul. 26, 2024  (CN) .......................... 202411010409.1

(51) Int. Cl.
*G02B 21/00* (2006.01)
*G02B 21/06* (2006.01)
*G02B 21/10* (2006.01)

(52) U.S. Cl.
CPC ......... *G02B 21/10* (2013.01); *G02B 21/0032* (2013.01); *G02B 21/0036* (2013.01); *G02B 21/0084* (2013.01)

(58) Field of Classification Search
CPC ............... G02B 21/00; G02B 21/0004; G02B 21/0012; G02B 21/0016; G02B 21/002; G02B 21/0024; G02B 21/0028; G02B 21/0032; G02B 21/0036; G02B 21/0048; G02B 21/0052; G02B 21/008;
(Continued)

(56) References Cited

U.S. PATENT DOCUMENTS 6,134,002 A * 10/2000 Stimson ................ G01J 3/2803
359/368
6,208,886 B1 * 3/2001 Alfano ................. A61B 5/0073
250/341.1
(Continued)

FOREIGN PATENT DOCUMENTS

CN           105487214 A  *  4/2016

*Primary Examiner* — Thong Q Nguyen
(74) *Attorney, Agent, or Firm* — M&B IP Analysts, LLC

(57) ABSTRACT

This application relates to the technical field of optical precision measurement and discloses a dark-field confocal microscopy measurement apparatus and method based on aperture scanning of vortex illumination. The apparatus includes a vortex illumination generation module, a vortex illumination aperture scanning module, a sample scanning module, and a dark-field lock-in detection module. On one hand, the vortex illumination aperture scanning module enables the light spot focused on the sample to scan a small range of the sample, generating oscillating signals that highlight the scattering signal of nano-scale defects on the sample. On the other hand, highly-sensitive oscillation signal detection is achieved using the dark-field lock-in detection module. In the present disclosure, the small-range aperture scanning of vortex illumination is combined with the dark-field lock-in detection to realize highly-sensitive detection of defects smaller than 50 nm.

16 Claims, 2 Drawing Sheets

(58) Field of Classification Search
CPC .... G02B 21/0084; G02B 21/02; G02B 21/06;
G02B 21/10; G02B 21/24; G02B 21/242;
G02B 21/36; G02B 21/361; G02B 21/365
USPC .................................................. 359/368–390
See application file for complete search history.

(56) References Cited

U.S. PATENT DOCUMENTS

| | | | | |
|---|---|---|---|---|
| 6,329,661 | B1 * | 12/2001 | Perov | G01N 21/6452 |
| | | | | 250/459.1 |
| 6,674,573 | B2 * | 1/2004 | Suzuki | G02B 21/002 |
| | | | | 359/368 |
| 7,969,582 | B2 * | 6/2011 | Fujii | G02B 21/0044 |
| | | | | 356/601 |
| 10,983,324 | B2 * | 4/2021 | Yabugaki | H03M 1/1255 |
| 2005/0046936 | A1 * | 3/2005 | Dixon | G02B 26/101 |
| | | | | 359/368 |

* cited by examiner

DARK-FIELD CONFOCAL MICROSCOPY MEASUREMENT APPARATUS AND METHOD BASED ON APERTURE SCANNING OF VORTEX ILLUMINATION

CROSS REFERENCE TO RELATED APPLICATION

This patent application claims the benefit and priority of Chinese Patent Application No. 202411010409.1, filed with the China National Intellectual Property Administration on Jul. 26, 2024, the disclosure of which is incorporated by reference herein in its entirety as part of the present application.

TECHNICAL FIELD

This application relates to the technical field of optical precision measurement, and in particular to a dark-field confocal microscopy measurement apparatus and method based on aperture scanning of vortex illumination.

BACKGROUND

High-energy optical components and semiconductor wafers are widely applied in precision instrument manufacturing and major photoelectric engineering research. The defect detection in optical components and semiconductor devices can effectively guarantee product yield and improve production efficiency. Currently, inspection requirements for optical components and semiconductor devices have shifted from surface defect detection to detecting subsurface and interlayer defects.

The confocal microscopy measurement technology has become essential for nondestructive detection in optical components and semiconductor wafers due to advantages such as excellent optical sectioning capability and high-resolution imaging. Conventional confocal microscopy technology struggles to effectively separate surface reflection information from subsurface scattering information, limiting the application in detecting subsurface defects of optical elements and interlayer defects of semiconductor integrated circuits. Dark-field confocal measurement technology, a significant branch of confocal microscopy measurement, collects light scattering signals from the sample against a dark background to achieve microscopic imaging with no fluorescent labels, high contrast, and high resolution. By effectively suppressing surface-reflected light, the dark-field confocal microscopy technology provides a new approach for surface and subsurface detection of components.

However, due to factors such as beam diffraction and multiple scattering effects of samples, conventional optical dark-field confocal microscopy measurement technology lacks necessary signal-to-noise ratio for detecting nano-scale defects. The general detection scale is limited to over 50 nm, resulting in an inadequate overall defect detection rate and the potential oversight of micro-defects smaller than 50 nm. Therefore, developing a highly-sensitive defect detection technology is an urgent challenge in the field of industrial inspection.

SUMMARY

The purpose of this application is to provide a dark-field confocal microscopy measurement apparatus and method based on aperture scanning of vortex illumination, to realize highly-sensitive detection of micro-defects less than 50 nm through the combination of a vortex illumination aperture scanning module and a dark-field lock-in detection module.

To achieve the above objective, this application provides the following technical solutions.

According to a first aspect, this application provides a dark-field confocal microscopy measurement apparatus based on aperture scanning of vortex illumination, including a vortex illumination generation module, a vortex illumination aperture scanning module, a sample scanning module, and a dark-field lock-in detection module.

The vortex illumination generation module is configured to generate vortex illumination;

the vortex illumination aperture scanning module includes a mirror, a uniaxial scanning galvanometer, a beam expander, a non-polarizing beam splitter, and an objective lens sequentially arranged in a light propagation direction of the vortex illumination generated by the vortex illumination generation module;

the non-polarizing beam splitter is configured to split a beam output by the beam expander and a signal return light reflected by a sample;

the objective lens is configured to: focus the split beam output by the beam expander onto the sample, and collect the signal return light to be incident on the non-polarizing beam splitter;

the uniaxial scanning galvanometer is configured to control a beam propagation direction of the vortex illumination reflected by the mirror, such that during scanning, a central dark spot of the vortex illumination incident on the objective lens moves back and forth from an entrance pupil center within an entrance pupil range of the objective lens, and a focused light spot focused on the sample oscillates and scans back and forth a small range of the sample, where the range is determined based on an aperture of the objective lens and a wavelength of light incident on the objective lens;

the sample scanning module is configured to control the sample to move during scanning, to enable the focused light spot on the sample to perform two-dimensional (2D) scanning or three-dimensional (3D) scanning in the sample;

the dark-field lock-in detection module sequentially includes a diaphragm, a focusing lens, a pinhole, a photomultiplier, and a lock-in amplifier sequentially arranged in a light propagation direction of the signal return light split by the non-polarizing beam splitter;

the diaphragm is configured to filter out reflected light in the signal return light and retain scattered light in a beam center; and the focusing lens is configured to focus the scattered light output by the diaphragm to be incident on the photomultiplier through the pinhole; the photomultiplier is configured to convert a light signal of the received scattered light into an electric signal; and the lock-in amplifier is configured to perform lock-in amplification processing on the electric signal output by the photomultiplier.

According to a second aspect, this application provides a dark-field confocal microscopy measurement method based on aperture scanning of vortex illumination, realized on the basis of the dark-field confocal microscopy measurement apparatus based on aperture scanning of vortex illumination, and including:

directing vortex illumination generated by the vortex illumination generation module to be incident on the mirror;

directing the vortex illumination reflected by the mirror to be incident on the uniaxial scanning galvanometer, and controlling, by the uniaxial scanning galvanometer, a beam propagation direction of the vortex illumination reflected by the mirror;

directing a beam output by the uniaxial scanning galvanometer to be incident on the non-polarizing beam splitter through the beam expander;

splitting, by the non-polarizing beam splitter, the beam output by the beam expander and directing the beam to be incident on the objective lens, where during scanning, a central dark spot of the vortex illumination incident on the objective lens moves back and forth from an entrance pupil center within an entrance pupil range of the objective lens;

focusing the beam output by the objective lens on the sample, where a focused light spot focused on the sample scans a small range of the sample, and the small range is determined based on an aperture and wavelength of the objective lens and a wavelength of light incident on the objective lens;

directing a signal return light reflected by the sample to be incident on the non-polarizing beam splitter through the objective lens;

splitting, by the non-polarizing beam splitter, the signal return light reflected by the sample, and directing the signal return light to be incident on the diaphragm, to filter out reflected light in the signal return light and retain scattered light in a beam center;

directing the beam output by the diaphragm to be incident on the photomultiplier after passing through the focusing lens and the pinhole in sequence;

converting, by the photomultiplier, a light signal of the received scattered light into an electric signal, and outputting the electric signal to the lock-in amplifier; and performing, by the lock-in amplifier, lock-in amplification processing on the electric signal output by the photomultiplier.

According to the specific embodiments provided in this application, this application discloses the following technical effects:

This application provides a dark-field confocal microscopy measurement apparatus and method based on aperture scanning of vortex illumination. On one hand, vortex illumination aperture scanning technology is introduced to control the beam propagation direction of vortex illumination using the uniaxial scanning galvanometer. This causes the vortex illumination incident on the objective lens to move back and forth from an entrance pupil center within an entrance pupil range of the objective lens. As a result, the order of the equivalent orbital angular momentum of the vortex illumination is changed. The light spot focused on the sample scans a small range of the sample, generating oscillating signals that highlight the scattering signal of nanoscale defects on the sample. On the other hand, the generated oscillation signals are detected with high sensitivity by using the lock-in amplification detection technology during the scanning process. In the present disclosure, the small-range aperture scanning of vortex illumination is combined with the dark-field lock-in detection to realize highly-sensitive detection of defects smaller than 50 nm.

BRIEF DESCRIPTION OF THE DRAWINGS

To describe the technical solutions in the examples of this application or in the prior art more clearly, the following briefly describes the accompanying drawings required for the examples. Apparently, the accompanying drawings in the following description show merely some examples of this application, and a person of ordinary skill in the art may still derive other accompanying drawings from these accompanying drawings without creative efforts.

REFERENCE NUMERALS

1—laser; 2—spiral phase plate; 3—mirror; 4—uniaxial scanning galvanometer; 5—beam expander; 6—non-polarizing beam splitter; 7—objective lens; 8—sample; 9—3D displacement platform; 10—diaphragm; 11—focusing lens; 12—pinhole; 13—photomultiplier; 14—lock-in amplifier; 15—signal generator.

DETAILED DESCRIPTION OF THE EMBODIMENTS

The technical solutions in embodiments of the present application are described below clearly and completely with reference to the drawings in the embodiments of the present application. Apparently, the described embodiments are merely part rather than all of the embodiments of the present application. All other embodiments obtained by those of ordinary skill in the art based on the embodiments of the present application without creative efforts should fall within the protection scope of the present application.

To make the above objectives, features, and advantages of this application more obvious and easy to understand, the present disclosure will be further described in detail with reference to the accompanying drawings and specific implementations.

Figure 1:
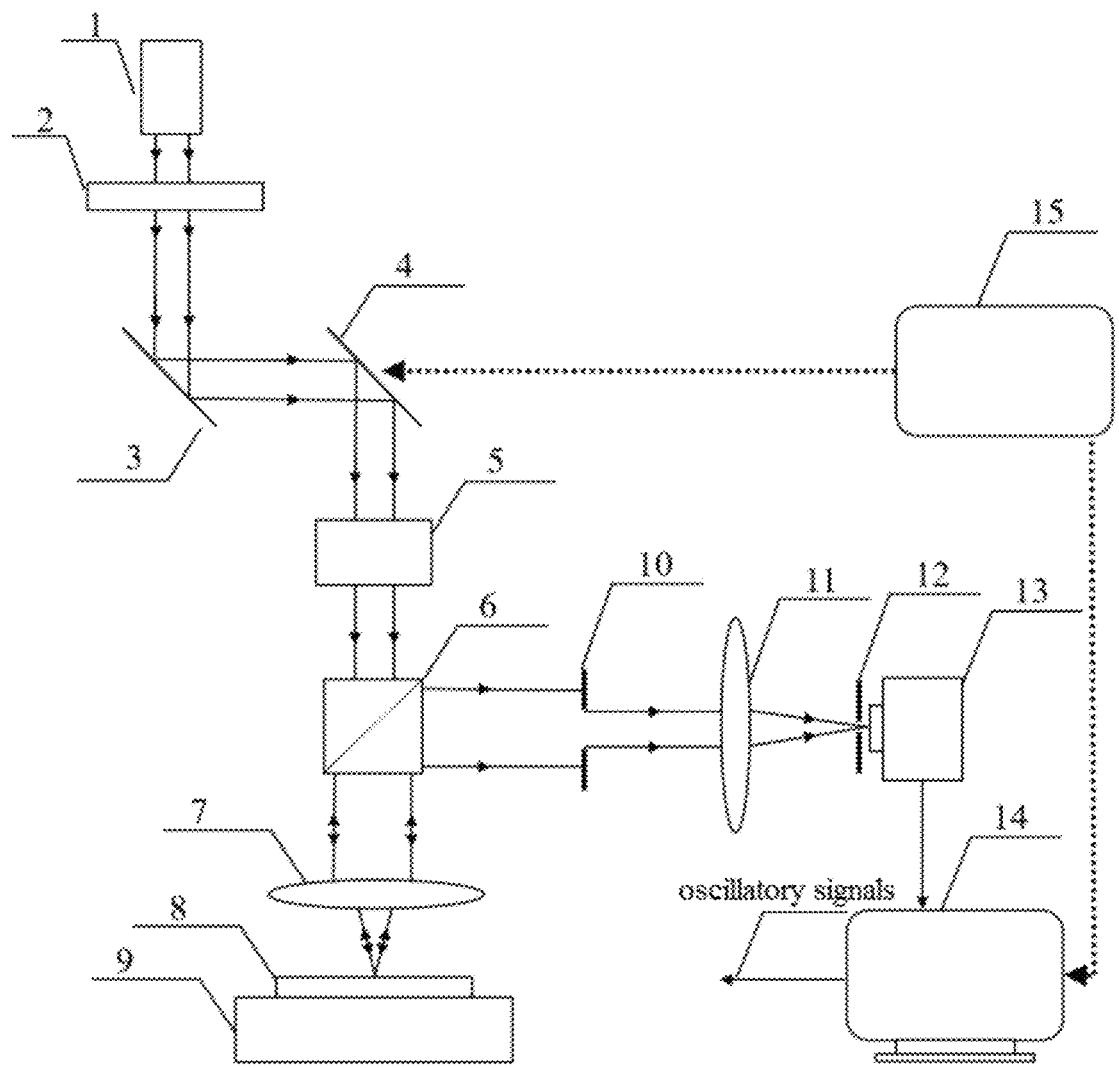
FIG. 1 is schematic structural diagram of a dark-field confocal microscopy measurement apparatus based on aperture scanning of vortex illumination according to an embodiment of this application.

As shown in FIG. 1, the embodiments provide a dark-field confocal microscopy measurement apparatus based on aperture scanning of vortex illumination, to realize small-range vortex illumination aperture scanning and dark-field lock-in detection on the sample. The apparatus specifically includes a vortex illumination generation module, a vortex illumination aperture scanning module, a sample scanning module, and a dark-field lock-in detection module.

The vortex illumination generation module is configured to generate vortex illumination. As shown in FIG. 1, the vortex illumination generation module includes a laser 1 and a spiral phase plate 2 sequentially arranged in a light propagation direction; and the spiral phase plate 2 is configured to convert laser light output by the laser 1 into the vortex illumination. The laser 1 emits laser light in the visible light band, which then enters the spiral phase plate 2. The center of the spiral phase plate 2 coincides with the optical axis center of the laser light, generating first-order vortex illumination.

The vortex illumination aperture scanning module includes a mirror 3, a uniaxial scanning galvanometer 4, a beam expander 5, a non-polarizing beam splitter 6, and an objective lens 7 sequentially arranged in a light propagation direction of the vortex illumination generated by the vortex illumination generation module.

The non-polarizing beam splitter 6 is configured to split a beam output by the beam expander 5 and a signal return light reflected by a sample 8.

The objective lens 7 is configured to: focus the split beam output by the beam expander 5 onto the sample 8, and collect the signal return light to be incident on the non-polarizing beam splitter 6.

The uniaxial scanning galvanometer 4 is configured to control a beam propagation direction of the vortex illumination reflected by the mirror 3. In this way, during scanning, a central dark spot of the vortex illumination incident on the objective lens 7 moves back and forth from an entrance pupil center within an entrance pupil range of the objective lens 7. As a result, the order of the equivalent orbital angular momentum of the vortex illumination is changed. A light spot focused on the sample 8 scans back and forth a small range of the sample 8. The small range is determined based on an aperture of the objective lens 7 and a wavelength of light incident on the objective lens 7, specifically, is 5 to 10 times $Na/2\lambda$. Na denotes the aperture of the objective lens 7 and $\lambda$ denotes the wavelength. Taking the first-order vortex illumination generated above as an example, the order of the vortex illumination deviating from the entrance pupil center is near the first-order, and therefore is described as the order of the equivalent orbital angular momentum.

The beam propagation process in the components of the vortex illumination aperture scanning module is as follows: The generated vortex illumination is incident on the uniaxial scanning galvanometer 4 via the mirror 3. The uniaxial scanning galvanometer 4 changes the beam propagation direction. The light reflected from the uniaxial scanning galvanometer is expanded by the beam expander 5 and split by the non-polarizing beam splitter 6, then enters the objective lens 7 and is focused onto the sample 8. The focused light spot scans a small range of the sample 8, and a central dark spot of the vortex illumination deviates from the entrance pupil center within the entrance pupil range of the objective lens 7 during the scanning process. Finally, the oscillating signal is generated during the vortex illumination scanning process. The signal return light reflected by the sample 8 is collected by the objective lens 7, and then split and reflected by the non-polarizing beam splitter 6 to the optical path of the subsequent dark-field lock-in detection module.

The sample scanning module is configured to control the sample 8 to move in the scanning process, to enable the focused light spot on the sample 8 to perform 2D scanning or 3D scanning in the sample 8.

As shown in FIG. 1, the sample scanning module includes a 3D displacement platform 9, and the sample 8 is located on the 3D displacement platform 9. The 3D displacement platform 9 drives the sample 8 to move, to control residence time of the focused light spot on the sample 8 at a scanning point to be more than 2 to 3 times a scanning period.

The dark-field lock-in detection module sequentially includes a diaphragm 10, a focusing lens 11, a pinhole 12, a photomultiplier 13, and a lock-in amplifier 14 sequentially arranged in a light propagation direction of the signal return light split by the non-polarizing beam splitter 6.

The diaphragm 10 is configured to filter out reflected light in the signal return light and retain scattered light in a beam center.

The focusing lens 11 is configured to focus the scattered light output by the diaphragm 10 to be incident on the photomultiplier 13 through the pinhole 12.

The photomultiplier 13 is configured to convert the received scattered light signal into an electric signal.

The lock-in amplifier 14 is configured to perform lock-in amplification processing on the electric signal output by the photomultiplier 13.

The beam propagation process in the components of the dark-field lock-in detection module is as follows: adjusting the aperture of diaphragm 10 to the size of the central dark spot of the vortex illumination, filtering out, by the diaphragm 10, the approximately annular reflected light from the signal return light, and retaining the central solid scattered light. Dark-field detection is then performed using the focusing lens 11, the pinhole 12, and the photomultiplier 13. The output signal from the photomultiplier enters the lock-in amplifier 14. After amplification by the lock-in amplifier 14, the weak oscillation signal, which is highly sensitive and scattered during the scanning process, is output. This amplification effect enables highly-sensitive detection of defects smaller than 50 nm based on the scattered oscillation signal.

In an optional embodiment, the dark-field lock-in detection module further includes a signal generator 15. The signal generator 15 is configured to control scanning frequencies of the uniaxial scanning galvanometer 4 and the lock-in amplifier 14. A reference signal of the lock-in amplifier 14 is provided by the signal generator 15, the scanning frequency of the lock-in amplifier 14 is the same as that of the uniaxial scanning galvanometer 4, and a phase difference between control signals of the lock-in amplifier 14 and the uniaxial scanning galvanometer 4 is a fixed value. In an example, the scanning frequency of the uniaxial scanning galvanometer 4 and the lock-in amplifier 14 is greater than 1 kHz. In the present disclosure, the signal output by the signal generator 15 to the uniaxial scanning galvanometer 4 is used by the uniaxial scanning galvanometer 4 to control the beam propagation direction.

In the embodiments, using vortex illumination aperture scanning technology, the positioning of the uniaxial scanning galvanometer 4 enables the beam to scan a small range of the sample 8, thereby generating oscillation signals. The oscillation signals highlight scattering signals from nanoscale defects, thereby facilitating detection of defects smaller than 50 nm. In the dark-field lock-in amplification detection technology, the oscillation signal is collected with high sensitivity, which is beneficial for detecting defects smaller than 50 nm.

This application further provides an application scenario to which the above dark-field confocal microscopy measurement apparatus based on aperture scanning of vortex illumination is applied. Specifically, the dark-field confocal microscopy measurement apparatus based on aperture scanning of vortex illumination provided in the embodiments can be applied to the defect detection scene of optical elements and semiconductor devices. The dark-field confocal microscopy measurement apparatus based on aperture scanning of vortex illumination provided in the embodiments is applied to the defect detection stage in the defect detection scene of optical elements and semiconductor devices.

Based on the same inventive concept, the embodiments of this application further provide a dark-field confocal microscopy measurement method based on aperture scanning of vortex illumination. The solution provided by this method is similar to that described in the above apparatus. For specific limitations on the method embodiments provided below, reference may be made to the limitations on the above dark-field confocal microscopy measurement apparatus based on aperture scanning of vortex illumination. Details are not described herein again.

Figure 2:
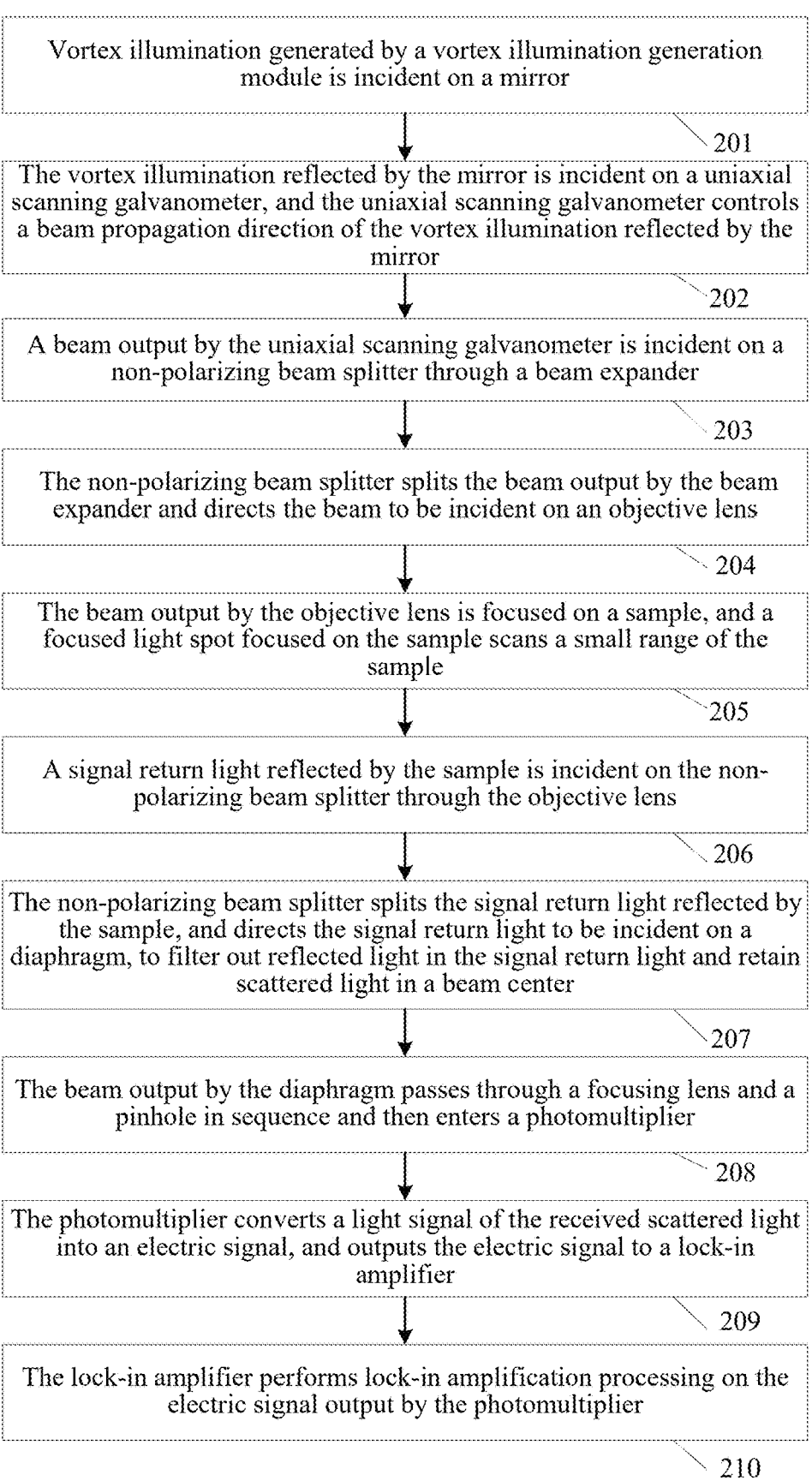
FIG. 2 is a schematic flowchart of a dark-field confocal microscopy measurement method based on aperture scanning of vortex illumination according to an embodiment of this application.

In an exemplary embodiment, as shown in FIG. 2, a dark-field confocal microscopy measurement method based on aperture scanning of vortex illumination is provided, including the following steps:

Step 201: Vortex illumination generated by a vortex illumination generation module is incident on a mirror 3.

Step 202: The vortex illumination reflected by the mirror 3 is incident on a uniaxial scanning galvanometer 4, and the uniaxial scanning galvanometer 4 controls a beam propagation direction of the vortex illumination reflected by the mirror 3.

Step 203: A beam output by the uniaxial scanning galvanometer 4 is incident on a non-polarizing beam splitter 6 through a beam expander 5.

Step 204: The non-polarizing beam splitter splits the beam output by the beam expander 5 and directs the beam to be incident on an objective lens 7. During scanning, a central dark spot of the vortex illumination incident on the objective lens 7 moves back and forth from an entrance pupil center within an entrance pupil range of the objective lens 7.

Step 205: The beam output by the objective lens 7 is focused on a sample 8, where a focused light spot focused on the sample 8 scans a small range of the sample 8, and the small range is determined based on an aperture of the objective lens 7 and a wavelength of light incident on the objective lens 7.

Step 206: A signal return light reflected by the sample 8 is incident on the non-polarizing beam splitter 6 through the objective lens 7.

Step 207: The non-polarizing beam splitter 6 splits the signal return light reflected by the sample 8, and directs the signal return light to be incident on a diaphragm 10, to filter out reflected light in the signal return light and retain scattered light in a beam center.

Step 208: The beam output by the diaphragm 10 passes through a focusing lens 11 and a pinhole 12 in sequence and then enters a photomultiplier 13.

Step 209: The photomultiplier 13 converts a light signal of the received scattered light into an electric signal, and outputs the electric signal to a lock-in amplifier 14.

Step 210: The lock-in amplifier 14 performs lock-in amplification processing on the electric signal output by the photomultiplier 13.

The technical characteristics of the above embodiments can be employed in arbitrary combinations. To provide a concise description of these embodiments, all possible combinations of all the technical characteristics of the above embodiments may not be described; however, these combinations of the technical characteristics should be construed as falling within the scope defined by the specification as long as no contradiction occurs.

Several examples are used herein for illustration of the principles and implementations of this application. The description of the foregoing examples is used to help illustrate the method of this application and the core principles thereof. In addition, those of ordinary skill in the art can make various modifications in terms of specific implementations and scope of application in accordance with the teachings of this application. In conclusion, the content of the present specification shall not be construed as a limitation to this application.

What is claimed is:

1. A dark-field confocal microscopy measurement apparatus based on aperture scanning of vortex illumination, comprising a vortex illumination generation module, a vortex illumination aperture scanning module, a sample scanning module, and a dark-field lock-in detection module;

the vortex illumination generation module is configured to generate vortex illumination;

the vortex illumination aperture scanning module comprises a mirror, a uniaxial scanning galvanometer, a beam expander, a non-polarizing beam splitter, and an objective lens sequentially arranged in a light propagation direction of the vortex illumination generated by the vortex illumination generation module;

the non-polarizing beam splitter is configured to split a beam output by the beam expander and a signal return light reflected by a sample;

the objective lens is configured to: focus the split beam output by the beam expander onto the sample, and collect the signal return light to be incident on the non-polarizing beam splitter;

the uniaxial scanning galvanometer is configured to control a beam propagation direction of the vortex illumination reflected by the mirror, such that during scanning, a central dark spot of the vortex illumination incident on the objective lens moves back and forth from an entrance pupil center within an entrance pupil range of the objective lens, and a focused light spot focused on the sample oscillates and scans back and forth a small range of the sample to generate oscillatory signals to highlight scattered signals from nano-scale defects of the sample, wherein the range is determined based on an aperture of the objective lens and a wavelength of light incident on the objective lens;

the sample scanning module is configured to control the sample to move during scanning, to enable the focused light spot on the sample to perform two-dimensional (2D) scanning or three-dimensional (3D) scanning in the sample;

the dark-field lock-in detection module sequentially comprises a diaphragm, a focusing lens, a pinhole, a photomultiplier, and a lock-in amplifier sequentially arranged in a light propagation direction of the signal return light split by the non-polarizing beam splitter;

the diaphragm is configured to filter out reflected light in the signal return light and retain scattered light in a beam center; and the focusing lens is configured to focus the scattered light output by the diaphragm to be incident on the photomultiplier through the pinhole; the photomultiplier is configured to convert a light signal of the received scattered light into an electric signal; and the lock-in amplifier is configured to perform lock-in amplification processing on the electric signal output by the photomultiplier, and output the oscillatory signals generated during scanning, to detect nano-scale defects through an amplification effect of the oscillatory signals on scattered signals of the nano-scale defects.

2. The dark-field confocal microscopy measurement apparatus based on aperture scanning of vortex illumination according to claim 1, wherein the vortex illumination generation module comprises a laser and a spiral phase plate sequentially arranged in the light propagation direction; and the spiral phase plate is configured to convert laser light output by the laser into the vortex illumination.

3. The dark-field confocal microscopy measurement apparatus based on aperture scanning of vortex illumination according to claim 2, wherein a center of the spiral phase plate coincides with an optical axis center of the laser light; and the vortex illumination is first-order vortex illumination.

4. The dark-field confocal microscopy measurement apparatus based on aperture scanning of vortex illumination according to claim 1, wherein the sample scanning module comprises a 3D displacement platform, and the sample is located on the 3D displacement platform.

5. The dark-field confocal microscopy measurement apparatus based on aperture scanning of vortex illumination according to claim 4, wherein residence time of the focused light spot on the sample at a scanning point is more than 2 to 3 times a scanning period.

6. The dark-field confocal microscopy measurement apparatus based on aperture scanning of vortex illumination according to claim 1, wherein the dark-field lock-in detection module further comprises a signal generator; and the signal generator is configured to control scanning frequencies of the uniaxial scanning galvanometer and the lock-in amplifier.

7. The dark-field confocal microscopy measurement apparatus based on aperture scanning of vortex illumination according to claim 6, wherein the scanning frequencies of the uniaxial scanning galvanometer and the lock-in amplifier are the same, and a phase difference between control signals of the uniaxial scanning galvanometer and the lock-in amplifier is a fixed value.

8. The dark-field confocal microscopy measurement apparatus based on aperture scanning of vortex illumination according to claim 7, wherein the scanning frequency of the uniaxial scanning galvanometer and the lock-in amplifier is greater than 1 kHz.

9. A dark-field confocal microscopy measurement method based on aperture scanning of vortex illumination, realized on the basis of the dark-field confocal microscopy measurement apparatus based on aperture scanning of vortex illumination according to claim 1, and comprising:

directing vortex illumination generated by the vortex illumination generation module to be incident on the mirror;

directing the vortex illumination reflected by the mirror to be incident on the uniaxial scanning galvanometer, and controlling, by the uniaxial scanning galvanometer, a beam propagation direction of the vortex illumination reflected by the mirror;

directing a beam output by the uniaxial scanning galvanometer to be incident on the non-polarizing beam splitter through the beam expander;

splitting, by the non-polarizing beam splitter, the beam output by the beam expander and directing the beam to be incident on the objective lens, wherein during scanning, a central dark spot of the vortex illumination incident on the objective lens moves back and forth from an entrance pupil center within an entrance pupil range of the objective lens;

focusing the beam output by the objective lens on the sample, wherein a focused light spot focused on the sample scans a small range of the sample, generating oscillatory signals to highlight scattered signals from nano-scale defects of the sample, and the small range is determined based on an aperture of the objective lens and a wavelength of light incident on the objective lens;

directing a signal return light reflected by the sample to be incident on the non-polarizing beam splitter through the objective lens;

splitting, by the non-polarizing beam splitter, the signal return light reflected by the sample, and directing the signal return light to be incident on the diaphragm, to filter out reflected light in the signal return light and retain scattered light in a beam center;

directing the beam output by the diaphragm to be incident on the photomultiplier after passing through the focusing lens and the pinhole in sequence;

converting, by the photomultiplier, a light signal of the received scattered light into an electric signal, and outputting the electric signal to the lock-in amplifier; and performing, by the lock-in amplifier, lock-in amplification processing on the electric signal output by the photomultiplier, and outputting the oscillatory signals generated during scanning, to detect nano-scale defects through an amplification effect of the oscillatory signals on scattered signals of the nano-scale defects.

10. The dark-field confocal microscopy measurement method according to claim 9, wherein the vortex illumination generation module comprises a laser and a spiral phase plate sequentially arranged in the light propagation direction; and the spiral phase plate is configured to convert laser light output by the laser into the vortex illumination.

11. The dark-field confocal microscopy measurement method according to claim 10, wherein a center of the spiral phase plate coincides with an optical axis center of the laser light; and the vortex illumination is first-order vortex illumination.

12. The dark-field confocal microscopy measurement method according to claim 9, wherein the sample scanning module comprises a 3D displacement platform, and the sample is located on the 3D displacement platform.

13. The dark-field confocal microscopy measurement method according to claim 12, wherein residence time of the focused light spot on the sample at a scanning point is more than 2 to 3 times a scanning period.

14. The dark-field confocal microscopy measurement method according to claim 9, wherein the dark-field lock-in detection module further comprises a signal generator; and the signal generator is configured to control scanning frequencies of the uniaxial scanning galvanometer and the lock-in amplifier.

15. The dark-field confocal microscopy measurement method according to claim 14, wherein the scanning frequencies of the uniaxial scanning galvanometer and the lock-in amplifier are the same, and a phase difference between control signals of the uniaxial scanning galvanometer and the lock-in amplifier is a fixed value.

16. The dark-field confocal microscopy measurement method according to claim 15, wherein the scanning frequency of the uniaxial scanning galvanometer and the lock-in amplifier is greater than 1 kHz.

\* \* \* \* \*